United States Patent
Fillep (10) Patent No.: US 11,672,204 B2
(45) Date of Patent: Jun. 13, 2023

(54) AGRICULTURAL HAYMAKING IMPLEMENT WITH OPERATING ELEMENTS MOVABLE BETWEEN AN OPERATING POSITION AND A TRANSPORT POSITION

(71) Applicant: AGCO International GmbH, Neuhausen (CH)

(72) Inventor: Johannes Fillep, Feucht (DE)

(73) Assignee: AGCO International GmbH, Neuhausen (CH)

( * ) Notice: Subject to any disclaimer, the term of this patent is extended or adjusted under 35 U.S.C. 154(b) by 390 days.

(21) Appl. No.: 17/079,635

(22) Filed: Oct. 26, 2020

(65) Prior Publication Data
US 2021/0120744 A1    Apr. 29, 2021

(30) Foreign Application Priority Data
Oct. 25, 2019   (GB) ..................................... 1915531

(51) Int. Cl.
*A01D 78/12*   (2006.01)
*A01D 57/12*   (2006.01)
(Continued)

(52) U.S. Cl.
CPC ............ *A01D 78/12* (2013.01); *A01B 73/044* (2013.01); *A01D 57/12* (2013.01); *A01B 59/042* (2013.01);
(Continued)

(58) Field of Classification Search
CPC .... A01D 78/12; A01D 57/12; A01D 78/1078; A01D 78/10; A01B 73/042; A01B 73/04; A01B 59/042
See application file for complete search history.

(56) References Cited

U.S. PATENT DOCUMENTS 4,046,203 A * 9/1977 Ward ................... A01B 73/044
                                                      172/657
4,316,511 A * 2/1982 Andersen ............. A01B 73/044
                                                      172/776
(Continued)

FOREIGN PATENT DOCUMENTS

DE          4340384 A1 * 2/1995   ........... A01B 73/042
DE   202007001281 U1 * 7/2007    ........... A01B 73/042
(Continued)

OTHER PUBLICATIONS

European Patent Office, OA and Search Report for related European Application No. EP 20 20 0457, dated Mar. 23, 2021.
(Continued)

*Primary Examiner* — Arpad F Kovacs (57) ABSTRACT

An agricultural implement having a main chassis member having a support structure with support arms connected to the support structure for movement between a working position and a transport position, the support arms being provided with operating elements remote from the support structure, the support structure defining a working width between the operating elements and the main chassis member, and the support arms being adjustable in the working position between a length corresponding to minimum working width and a length greater than the minimum working width. In the transport position a distance between the operating elements and the main chassis member is less than the minimum working width. In a headland position the support arms are adjustable such that a distance between the operating elements and the main chassis member is less than the minimum working width.

11 Claims, 7 Drawing Sheets

(51) Int. Cl.
*A01B 73/04* (2006.01)
*A01D 78/10* (2006.01)
*A01B 59/042* (2006.01)

(52) U.S. Cl.
CPC ........ *A01B 73/042* (2013.01); *A01D 78/1078* (2013.01)

(56) References Cited

U.S. PATENT DOCUMENTS

| | | | | |
|---|---|---|---|---|
| 4,570,722 | A * | 2/1986 | Osborn | A01B 73/044 172/311 |
| 4,723,404 | A * | 2/1988 | Aron | A01D 78/1014 56/370 |
| 9,277,690 | B2 * | 3/2016 | Arnold | A01D 78/1028 |
| 2003/0041584 | A1 * | 3/2003 | Breneur | A01D 78/1085 56/379 |
| 2003/0150626 | A1 * | 8/2003 | Domries | A01B 59/042 172/311 |
| 2020/0077565 | A1 * | 3/2020 | Gembler | A01D 78/1014 |

FOREIGN PATENT DOCUMENTS

| | | | | |
|---|---|---|---|---|
| DE | 102016117117 A1 * | 3/2018 | ......... | A01D 78/1078 |
| DE | 202020103922 U1 * | 11/2021 | ......... | A01D 78/1014 |
| EP | 0381970 A2 | 8/1990 | | |
| EP | 0454602 A1 * | 10/1991 | .......... | A01B 73/042 |
| EP | 0517632 A1 * | 12/1992 | .......... | A01B 73/042 |
| EP | 1665922 A1 * | 6/2006 | ......... | A01D 78/1085 |
| EP | 1782675 A1 | 5/2007 | | |
| EP | 2 022 316 A1 | 2/2009 | | |
| EP | 2253186 A1 * | 11/2010 | ............. | A01B 73/04 |
| EP | 2499897 A1 * | 9/2012 | .......... | A01D 78/1014 |
| EP | 2661952 A1 | 11/2013 | | |
| EP | 3 095 316 A1 | 11/2016 | | |
| EP | 3254549 A1 | 12/2017 | | |
| EP | 3284330 A1 * | 2/2018 | ............. | A01B 73/04 |
| EP | 3622803 A1 | 3/2020 | | |
| EP | 3430884 B1 * | 5/2021 | .......... | A01D 78/1014 |
| EP | 3590322 B1 * | 6/2021 | .......... | A01D 78/1014 |

OTHER PUBLICATIONS

UK Intellectual Property Office, Search Repod for UK priority Application No. GB 1915531.6, dated Apr. 20, 2020.

* cited by examiner

Figure 12

AGRICULTURAL HAYMAKING IMPLEMENT WITH OPERATING ELEMENTS MOVABLE BETWEEN AN OPERATING POSITION AND A TRANSPORT POSITION

CROSS REFERENCE TO RELATED APPLICATION

This application claims the benefit of UK Application No. 1915531.6, filed Oct. 25, 2019, which is hereby incorporated by reference in its entirety.

BACKGROUND

Field of the Invention

The present invention relates to an improved agricultural implement in which operating elements extending to each side of a central axis are moved between an operating position and a transport position. The invention has particular application to a haymaking apparatus such as a rake or tedder.

Discussion of Related Art

It is known to provide haymaking apparatus in which arms extending to each side of a central chassis member are articulated such that the arms can be moved between a generally horizontal working position and a generally vertical transport position. Each of the arms supports one or more operating elements, such as rake or tedder rotors. It is desirable to increase the number of such operating implements to produce broader working widths of such tools. However, the height of the apparatus with the arms on the transport position is strictly regulated. It is also an engineering problem that the size, shape and location of the working units and the length of the arms creates an unfavourable centre of gravity that needs to be accounted for when the arms are being moved between the working position and the transport position.

A known solution, EP 2 661 952, involves adjusting the length of the arms and allowing raising of the arms into the transport position only when the arm has been shortened.

It is an advantage of the present invention that it provides an alternative solution to this problem. Other advantages will be apparent from the following text.

SUMMARY OF THE INVENTION

According to a first aspect of the present invention, an agricultural implement comprises a central chassis member having a support structure with support arms connected to the support structure for movement between a working position and a transport position, the support arms being provided with operating elements remote from the support structure, the support structure defining a working width between the operating elements and the main chassis member, and the support arms being adjustable in the working position between a length corresponding to minimum working width and a length greater than the minimum working width and in which in the transport position a distance between the operating elements and the main chassis member is less than the minimum working width, characterised in that in a headland position located between the working position and the transport position the support arms are adjustable such that a distance between the operating elements and the main chassis member is less than the minimum working width.

Preferably, each support arm comprises an inner part displaceable with respect to an outer part, the operating element of the respective support arm being operably connected to the inner part.

Preferably the main chassis member comprises a first arcuate part and a second arcuate part radially displaced a first distance from the first arcuate part.

More preferably the inner part of each support arm may be rotated past the first arcuate portion and displaced with respect to the outer part to reduce the working width by a distance corresponding to the first distance.

More preferably the inner part of each support arm is displaced towards the second arcuate part of the main chassis member.

More preferably the inner part is hydraulically displaced with respect to the outer part.

Preferably, the agricultural implement further comprises a displaceable lever, a headland flap and biasing means connecting the headland flap to the displaceable lever.

More preferably the displaceable lever is rotatable.

Preferably the displaceable lever is displaced by movement of the inner part of the support arm with respect to the outer part to reduce the working width of the support arm.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel. Unless the context indicates otherwise, the left and right hand sides of the agricultural implement are symmetrical about the centre axis.

Figure 1:
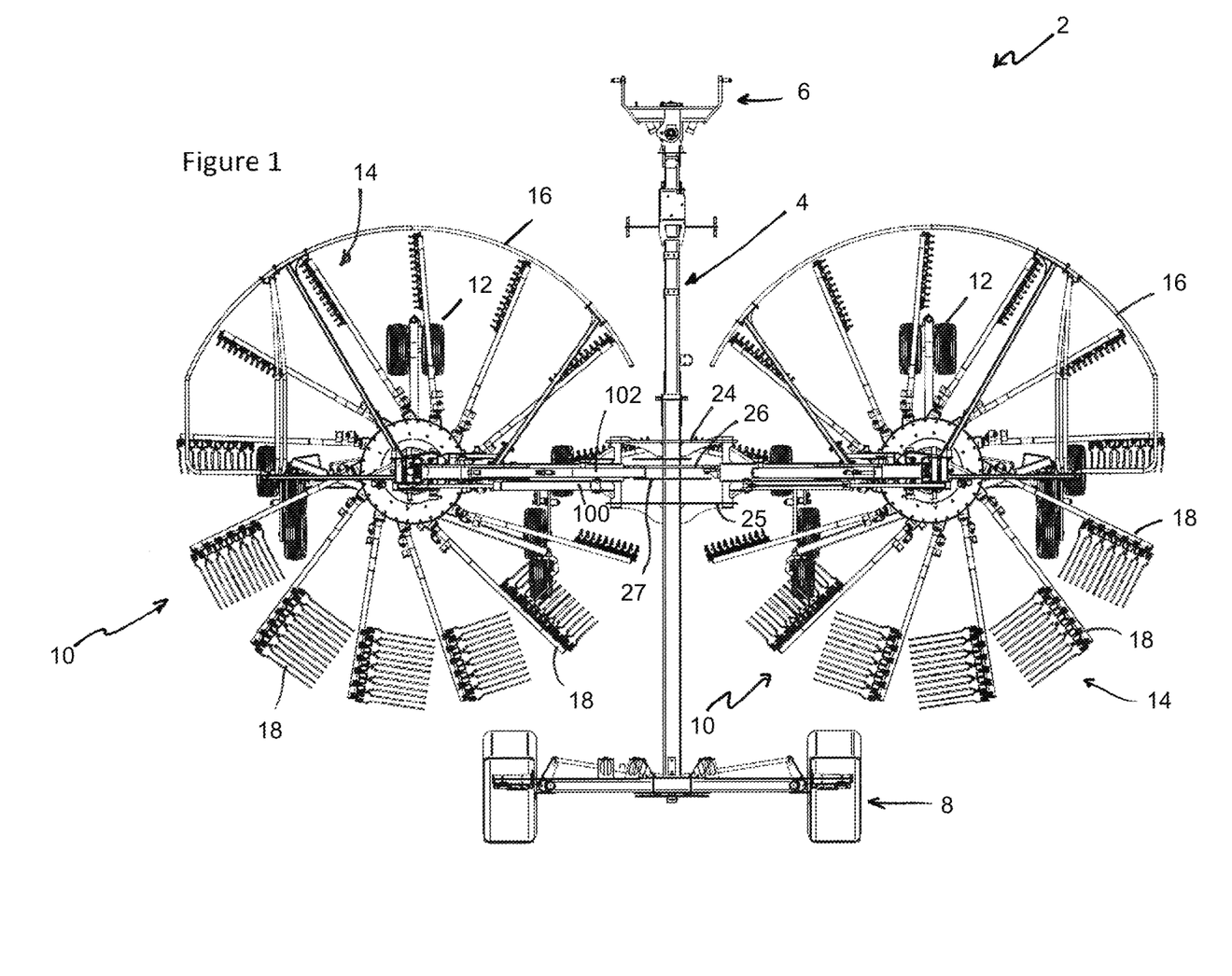
FIG. 1 shows a plan view of a rake in which the support arms are each in a working position.

With reference to FIG. 1, there is shown a towed agricultural implement 2 comprising a central main chassis member 4 and first and second operating elements 10 disposed to either side of the central main chassis member 4. The central main chassis member 4 is provided at a front end with a suitable connection apparatus 6, for example a three point hitch, for connecting the towed agricultural implement 2 to an agricultural vehicle such as a tractor and at a rear end with a set of steerable wheels 8.

Each of the operating elements 10 can be seen to comprise a wheel support structure 12 supporting a rake rotor 14 and an associated front guard rail 16. The rake rotor 14 typically comprises a plurality of tine carrying tine arms 18, each of the tine arms 18 being held in a central hub arrangement adapted to adjust the radial alignment of each tine arm 18 about its longitudinal axis as the hub rotates.

Each operating unit 10 is connected to the main chassis member 4 by a support arm 20. A support structure, by which the support arm is connected to the main chassis member is described in greater detail by reference to FIGS. 2 to 13. While the support structure for each side of the main chassis member corresponds only one side is shown for clarity in these Figures.

Each support arm 20 comprises an inner part 70 and an outer part 72. Each of the inner and outer support arm parts 70,72 is formed as a hollow member. The inner support arm part 70 is nested for movement within the outer support arm part 72 as described below.

An inner end of the inner support arm part 70 is provided with an inner mounting bracket 84 in which a rotatable roller 86 is mounted. Conveniently the inner mounting bracket 84 is provided with suitable bearings, such as plastics bearings, in which the roller 86 may rotate.

Figure 5:
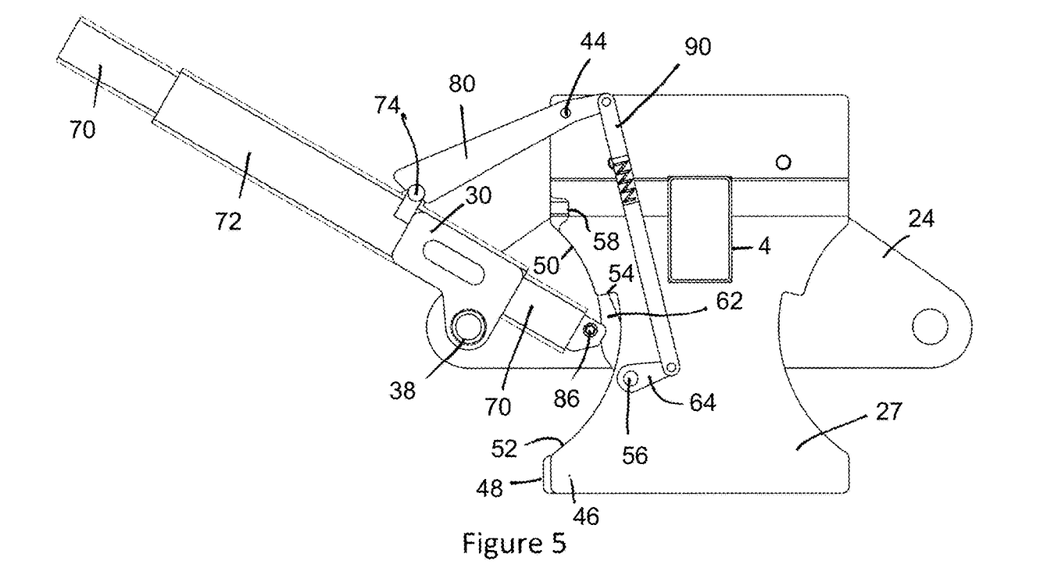
FIG. 5 shows a perspective view of the elements of the support structure shown in the position of FIG. 4.

The outer support arm part 72 is provided toward an inner end with an upwardly protruding structure 74 extending across one side of the outer support arm part 72 (as best seen in FIG. 5).

The support structure comprises two sets of elements connected to the main chassis member 4 by any suitable means, for example by welding: a first set of support plates 24,25 defining outer longitudinal boundaries of the support structure and a pair of mounting plates 26,27 disposed between the support plates 24,25.

Each of the support plates 24,25 are generally triangular with lower points extending to either side. Each support plate 24,25 includes a central opening of shape and size corresponding to an outer cross section of the main chassis member 4 by which the support plates 24,25 are mounted on the main chassis member 4. The lower points of the support plates 24,25 are further provided with circular openings.

Tubular mounting points are provided in alignment with the circular openings in the support plates 24,25. The tubular mounting points and the circular openings together support a generally cylindrical tubular member 38. A mounting bracket 30 secured to the outer support arm part 72 connects the generally cylindrical tubular member 38 with the outer support arm part 70. In use, this allows for pivoting movement of the outer support arm part 72 with respect to the support structure about a central axis of the cylindrical tubular member 38.

Each of the pair of mounting plates 26,27 is generally rectangular and symmetric about a centre axis. Each plate 26,27 includes a central opening of shape and size corresponding to the outer cross section of the main chassis member 4 by which the mounting plates 26,27 are mounted and secured, for example by welding, onto the main chassis member 4. Upper corners of the first mounting plate 26 are provided with openings to serve as attachment points for a first pivot pin 44. Lower corners of the first mounting plate 26 are provided with outwardly extending feet 46.

A plate or block 48 is secured across the outwardly extending feet 46 of the mounting plates 26,27. The plate or block 48 may be formed of any suitable material, preferably a durable plastics material. The plate or block 48 may be secured to the mounting plates 26, 27 in any suitable manner.

Each of the mounting plates 26,27 is provided at each side with a first upper inwardly extending arcuate section 50 and a second lower inwardly extending arcuate section 52. The inwardly extending arcuate sections 50,52 are joined by a shoulder region 54. In the illustrated embodiment, the shoulder region is generally horizontal.

An opening is proved in each plate adjacent the second lower inwardly extending arcuate section, to serve as an attachment point for a second pivot pin 56. One of the mounting plates, here mounting plate 27 is also provided with a cut away potion 58 above an upper end of the first upper inwardly extending arcuate section.

A first hydraulic cylinder 100 (FIG. 1, omitted from subsequent Figures for clarity) is connected at a first inner end to pivot pin between mounting plates 26,27 and at a second outer end to a mounting provided at an outer part of the outer support arm part 72.

A second hydraulic cylinder 102 (FIG. 1, again omitted from subsequent Figures for clarity) is connected at a first inner end to a mounting provide at an inner end of the outer support arm 72 and at a second outer end to a mounting provided at an outer end of the inner support arm part 70.

Figure 2:
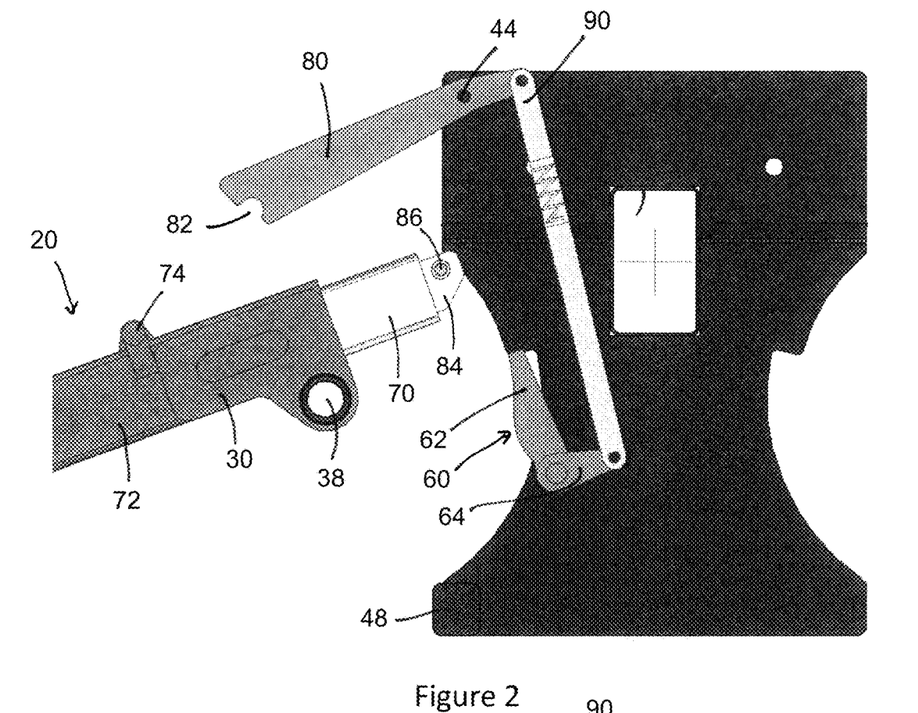
FIG. 2 shows elements of a support structure for use in the present invention in which the support arm on the left is in a lowermost working position.
Figure 3:
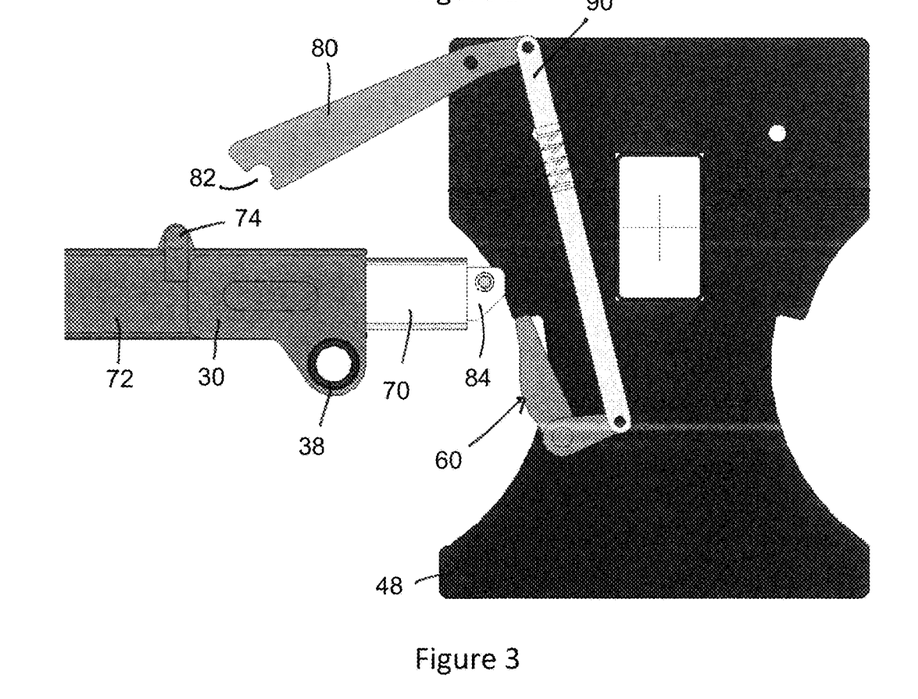
FIG. 3 shows a view similar to FIG. 2 in which the support arm has been raised to a horizontal position.

Returning to the support structure, a pivoting lever 60 is provided on the second pivot pin 56. The pivoting lever 60 comprises a central part 62, in use located between the mounting plates 26,27, and at least one outer part 64 located outside of the mounting plates 26,27. In the Figures a single outer part is shown. The outer part 64 has a fixed orientation with respect to the central part 62. In the illustrated embodiment, the outer part 64 and the central part 62 are substantially perpendicular to one another, though other orientations may be provided for. The central part 62 of the pivoting lever 60 is provided with a cammed surface. An upper portion of the cammed surface has the same arcuate shape as the upper inwardly extending arcuate section 50. In FIG. 2 it can be seen that the upper portion of the cammed surface is aligned with the upper inwardly extending arcuate section 50 to form a continuous curved surface against which the rotatable roller 86 may run.

A headland flap 80 is pivotally mounted about the first pivot pin 44. A free end of the headland flap 80 is provided with a shaped recess 82. In practice, the shaped recess 82 is adapted to engage or marry with the protruding structure 74 on the outer support arm part 72.

A biasing member 90 is pivotally connected at a first end to a second end of the headland flap 80 and pivotally connected at a second end to a free end of the outer part 64 of the pivoting lever 60. In the illustrated embodiment the biasing member 90 is a spring biased member.

In normal working positions of the agricultural implement (such as that shown in FIGS. 2 and 3) the biasing member 90 acts to keep the upper portion of the cammed surface of the pivoting lever 60 in alignment with the upper inwardly extending arcuate sections 50 of the mounting plates 26,27. The upper arcuate sections 50 can be seen to define the normal range of working positions (with the support arm in a minimum working width position) and accordingly the arrangement of the operating elements 10 of the agricultural implement, either manually through an operator or automatically through an electronic control unit, can be manipulated to adjust to the contours of the ground over which the agricultural implement is being moved.

If, in the working positons, it is desired to lengthen the support arm 20 the first hydraulic cylinder 100 may be extended. However, the support arm 20 may not be shortened beyond the positions shown in FIGS. 2 and 3, that is below the minimum working width, since the rotatable roller 86 is in contact with the first upper inwardly extending arcuate sections 50 of the mounting plates 26,27 and accordingly the first upper inwardly extending arcuate sections 50 function as a stop to prevent such movement.

As described below, it will be understood that the support arms 20 may be partially raised to a headland position and the minimum working width maintained, or optionally the length of the support arms reduced below the minimum working width.

Figure 4:
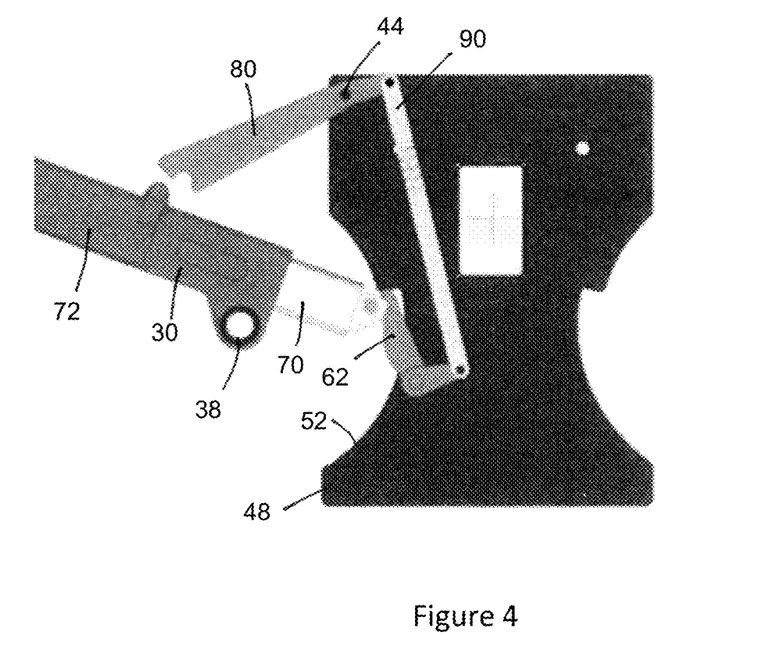
FIG. 4 shows a view similar to FIG. 2 in which the support arm has been raised further.
Figure 6:
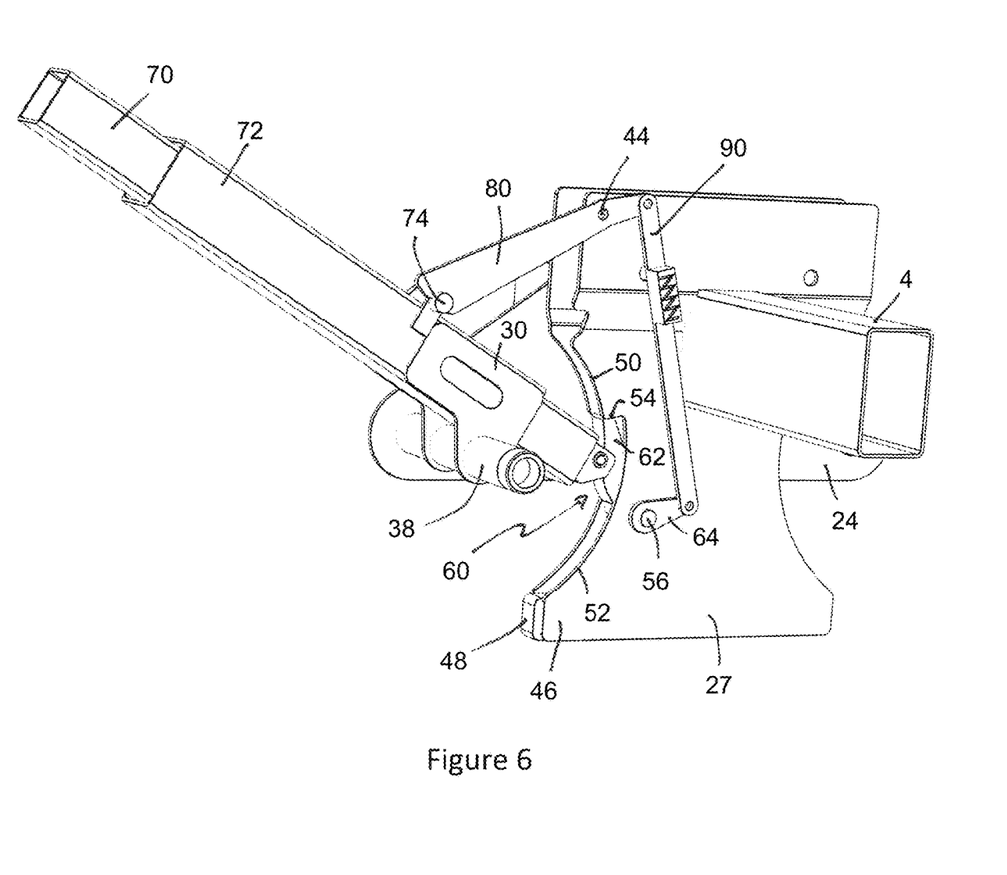
FIG. 6 shows a view similar to FIG. 5 in which the support arm has been lowered.

In order to further reduce the length of the support arm 20, the support arm 20 must first be raised. This is achieved by actuation of the second hydraulic cylinder 102 to shorten its length. This causes the inner and outer support arm parts 70,72 to pivot about the tubular member 38. As can be seen in FIGS. 4, 5 & 6, this also causes the rotatable roller 86 to travel along the upper portion of the cammed surface of the pivoting lever 60. Initial movement along the upper portion of the cammed surface of the pivoting lever 60 guides the protruding structure 74 on the support arm outer part 72 into the recess on the headland flap 80 (FIG. 4).

The protruding structure 74 is located in the recess 82 in the headland flap 80 (cf FIGS. 4 and 5) in the headland position.

Figure 7:
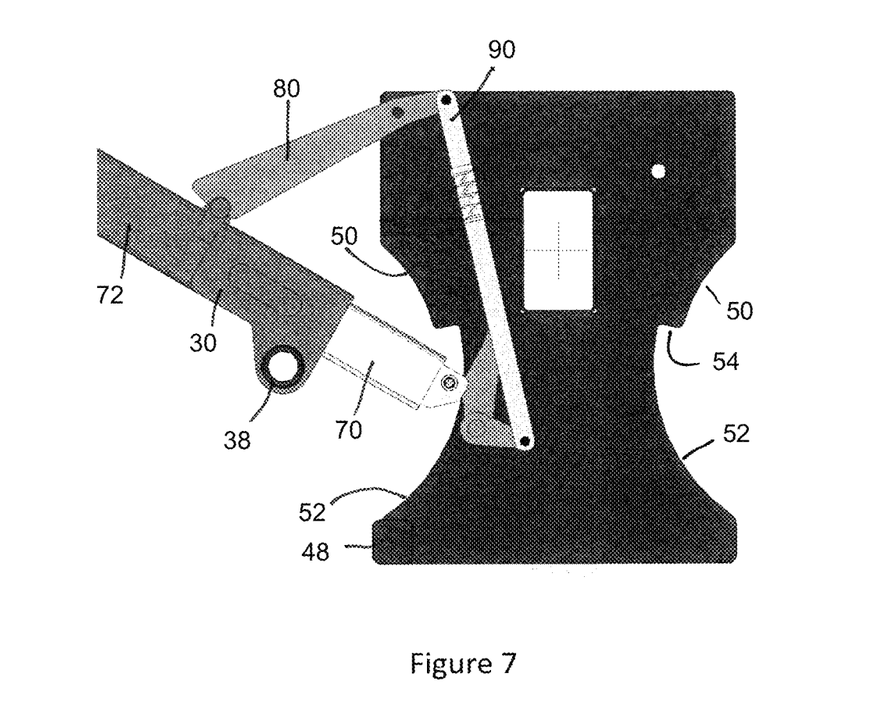
FIG. 7 shows a view similar to FIG. 6 in which the support arm has been raised again.

Since in the illustrated embodiment the arcs of each of the upper and the lower arcuate segments 50,52 are centred about the rotational axis of the rotatable bolt 38, in the headland position in which the rotatable roller 86 is in contact with the lever 60 the support arm 20 may be shortened under the action of the first hydraulic cylinder 100 by a distance corresponding to the size of the shoulder 54 connecting the inwardly extending arcuate sections 50,52 of the mounting plates, that is until the lever is displaced such that the rotatable roller 86 engages with the lower arcuate surface 52 (FIG. 7). In this way, the distance between the operating elements 10 carried by the support arms 22 and the main chassis member 4 in the headland position is less than the minimum working width in the working positions. This allows for operation of the agricultural implement in a manner that ensures that in the headland position the operating implements 10 have no ground contact.

Figure 8:
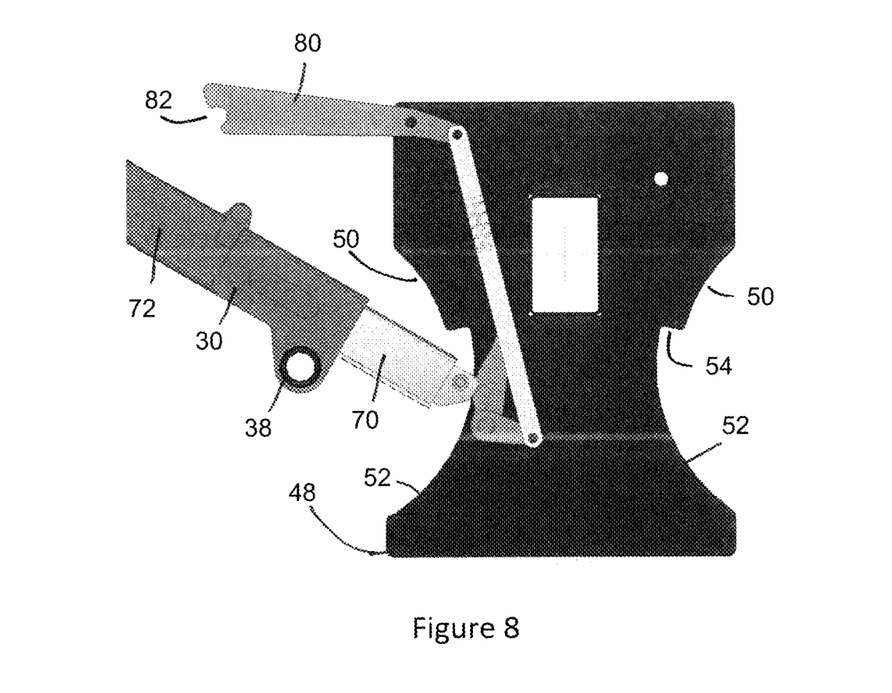
FIG. 8 shows a view similar to FIG. 7 in which the headland flap has moved.

Moving the inner support arm part 70 inward displaces the lever 60 causing it to rotate about the second pivot pin 56. This causes the outer part 64 of the lever 60 to place the biasing means 90 under tension and the free end of the headland flap 80 is pivoted upwards about the first pivot pin 44 by the action of the biasing member (FIG. 8).

Figure 9:
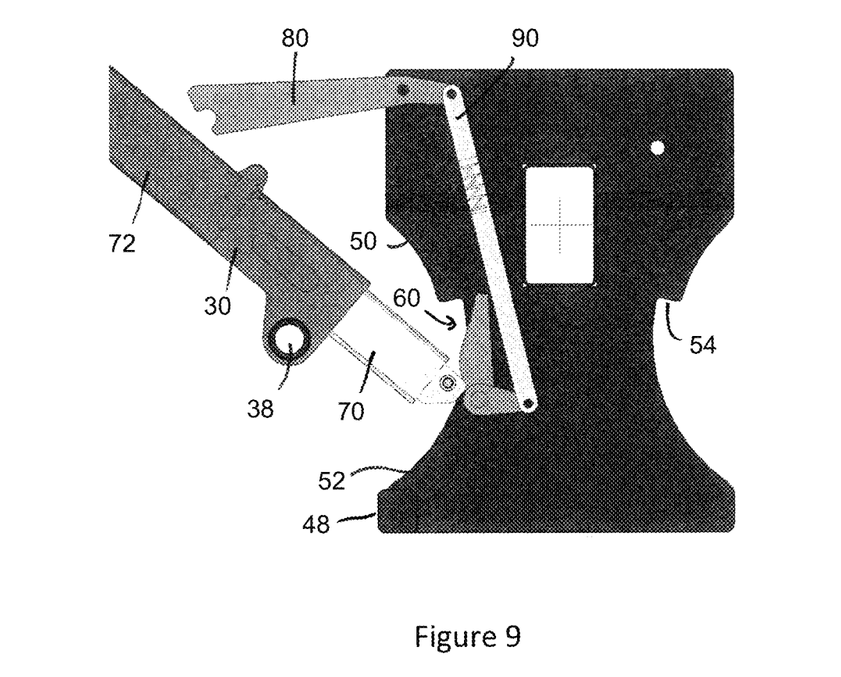
FIG. 9 shows a view similar to FIG. 8 in which the support arm has been raised further.
Figure 10:
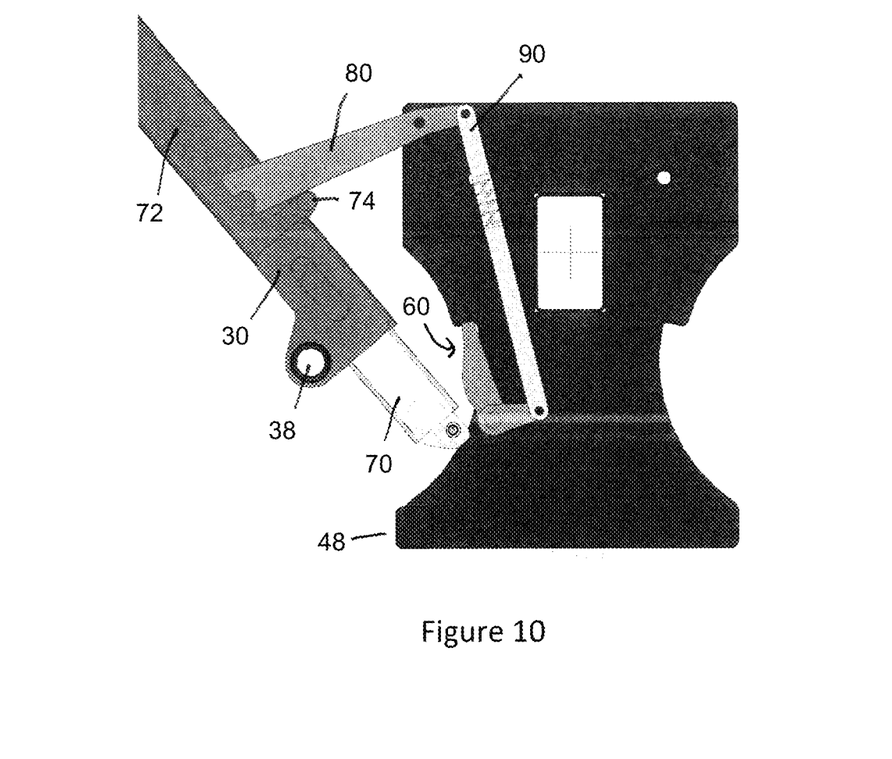
FIG. 10 shows a view similar to FIG. 9 in which the support arm has been raised still further.

To move the support arm beyond the headland position and into the transport position the support arm 22 is then rotated further towards the vertical (FIG. 9). Once the rotatable roller 86 has been rotated past the rotatable lever 60 the lever is biased to rotate back. As the support arm 22 continues to rotate a lower surface of the headland flap 80 comes to rest against the protruding structure 74 (FIG. 10).

Figure 11:
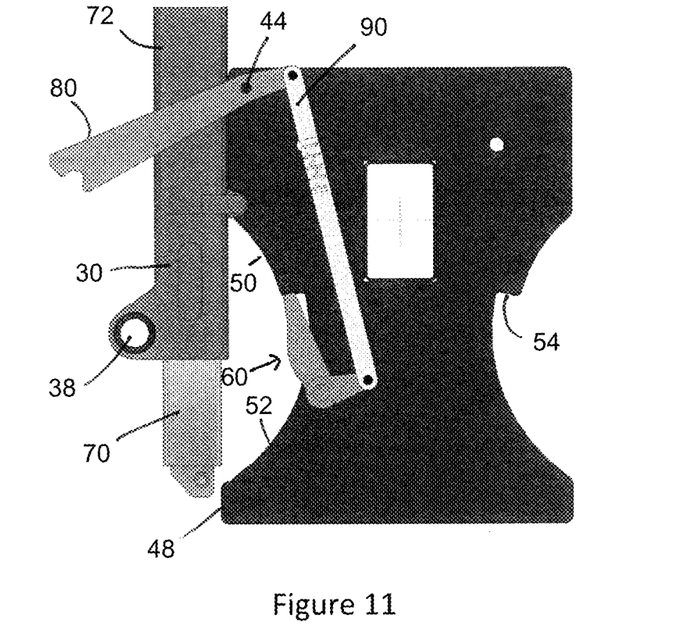
FIG. 11 shows a view similar to FIG. 10 in which the support arm has been raised to an upright position.
Figure 12:
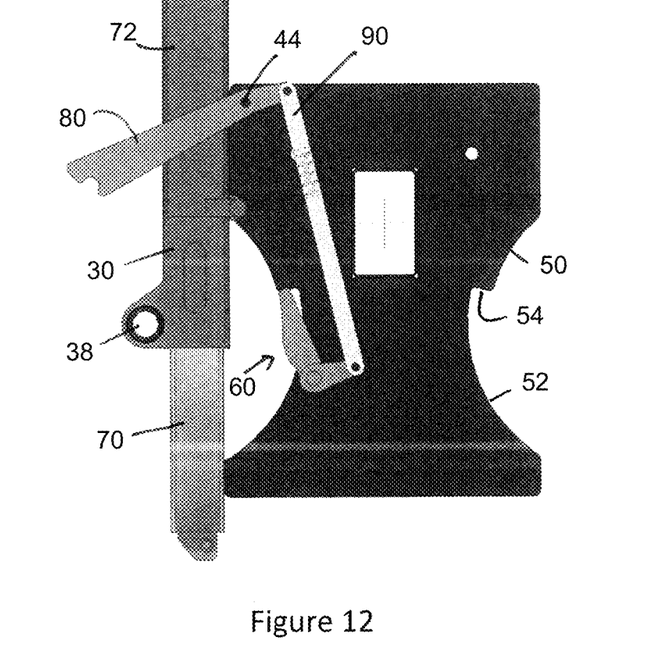
FIG. 12 shows a view similar to FIG. 11 in which the inner part of the support arm has been lowered to a transport position.

Continued rotation will result in the outer support arm part 72 adopting a substantially vertical position (FIG. 11). In this position the protruding structure 74 is received and seated within the cut away portion 58 of plate 27.

With the support arm 22 in the vertical position it can be seen that the headland flap 80, biasing member 90 and lever 60 have all returned to their original positions.

The first hydraulic cylinder 100 may now be actuated once again to reduce its length in order to move the inner support arm part 70 further within the outer support arm part 72. The inner end of the inner support arm part 70 is free to move downward past the vertical longitudinally extending plate 48 (or an outer face of the block). It will be seen that in this position (FIG. 12), the transport position, the vertical longitudinally extending plate 48 serves as a stop to prevent the support arm 20 from being rotated away from the transport position. This stop may be adjustable for clearance free operation.

In order to return the support arm 20 to the working position, the first hydraulic cylinder 100 must be actuated to extend it length and so draw the inner support arm part 70 upward within the outer support arm part 72 until the rotatable roller 86 can clear a lower edge of the arcuate surface 52 of the guide member 58 and then again so that the rotatable bolt can clear the lower edge of the upper arcuate surface 50. Preferably the first hydraulic cylinder 100 draws the inner support arm part 70 upward within the outer support arm part 72 until the rotatable roller 86 can clear a lower edge of the arcuate surface 50 of the guide member 58 in a single motion. The second hydraulic cylinder 102 can then be actuated to rotate the support arm 20 into the working position.

The present invention has as an advantage that control of the raising and lowering of the support arm 20 is achieved solely through the use of the hydraulic cylinders 100,102. It is not necessary to control movement of additional parts to achieve this functionality.

From reading the present disclosure, other modifications will be apparent to persons skilled in the art. Such modifications may involve other features which are already known in the field of rakes and tedders and component parts therefore and which may be used instead of or in addition to features already described herein.

The invention claimed is:

1. An agricultural implement comprising:
    a main chassis member having a support structure with support arms connected to the support structure for movement between a working position and a transport position, the support arms comprising operating elements remote from the support structure, wherein the support structure defines a working width between the operating elements and the main chassis member, wherein each support arm comprises an inner part displaceable with respect to an outer part, wherein the operating elements of the each support arm are operably connected to the inner part,
    wherein the support arms are adjustable in the working position between a length corresponding to a minimum working width and a length greater than the minimum working width, wherein in the transport position a distance between the operating elements and the main chassis member is less than the minimum working width, wherein the support arms are adjustable when in a headland position located between the working position and the transport position such that the distance between the operating elements and the main chassis member is less than the minimum working width; and wherein the main chassis member comprises a first arcuate part and a second arcuate part, wherein the second arcuate part is radially displaced a first distance from the first arcuate part.

2. The agricultural implement according to claim 1, wherein the inner part of each support arm is rotatable past the first arcuate part and displaced with respect to the outer part to reduce the working width by a distance corresponding to the first distance.

3. The agricultural implement according to claim 2, wherein the inner part of each support arm is displaced towards the second arcuate part of the main chassis member.

4. The agricultural implement according to claim 1, wherein the inner part is hydraulically displaced with respect to the outer part.

5. The agricultural implement according to claim 1, wherein the agricultural implement further comprises a displaceable lever, a headland flap and biasing means connecting the headland flap to the displaceable lever.

6. The agricultural implement according to claim 5, wherein the displaceable lever is rotatable.

7. The agricultural implement according to claim 5, wherein the displaceable lever is displaced by movement of the inner part of each support arm with respect to the outer part to reduce the working width of each support arm.

8. The agricultural implement according to claim 1, wherein the upper arcuate part cooperates with an inner end of the inner part to define the minimum working width and the second arcuate part cooperating with an inner end of the inner part to enable a distance between the operating elements and the main chassis member that is less than the minimum working width.

9. An agricultural implement comprising:
a main chassis member having a support structure with support arms connected to the support structure for movement between a working position and a transport position, the support arms comprising operating elements remote from the support structure, wherein the support structure defines a working width between the operating elements and the main chassis member, wherein each support arm comprises an inner part displaceable with respect to an outer part, wherein the operating elements of the each support arm are operably connected to the inner part, wherein the support arms are adjustable in the working position between a length corresponding to a minimum working width and a length greater than the minimum working width, wherein in the transport position a distance between the operating elements and the main chassis member is less than the minimum working width, wherein the support arms are adjustable when in a headland position located between the working position and the transport position such that the distance between the operating elements and the main chassis member is less than the minimum working width; and a displaceable lever;

a headland flap; and biasing means connecting the headland flap to the displaceable lever.

10. The agricultural implement according to claim 9, wherein the displaceable lever is rotatable.

11. The agricultural implement according to claim 9, wherein the displaceable lever is displaced by movement of the inner part of each support arm with respect to the outer part to reduce the working width of each support arm.

* * * * *